United States Patent [19]
Gershen et al.

[11] Patent Number: 5,166,853
[45] Date of Patent: Nov. 24, 1992

[54] SHOCK HAZARD PROTECTION SYSTEM

[75] Inventors: Bernard Gershen, Centerport; Saul Rosenbaum, East Meadow; James N. Pearse, Dix Hills, all of N.Y.

[73] Assignee: Leviton Manufacturing Co., Inc., Little Neck, N.Y.

[21] Appl. No.: 758,173

[22] Filed: Sep. 11, 1991

Related U.S. Application Data

[63] Continuation of Ser. No. 618,271, Sep. 6, 1990, abandoned, which is a continuation of Ser. No. 471,258, Jan. 26, 1990, abandoned, which is a continuation of Ser. No. 352,077, May 15, 1989, abandoned, which is a continuation of Ser. No. 185,571, Apr. 25, 1988, abandoned, which is a continuation of Ser. No. 82,259, Aug. 6, 1987, abandoned, which is a continuation of Ser. No. 1,715, Jan. 9, 1987, Pat. No. 4,709,293, which is a continuation of Ser. No. 880,396, Jun. 30, 1986, abandoned, which is a continuation of Ser. No. 558,260, Dec. 5, 1983, abandoned.

[51] Int. Cl.$^5$ ............................................. H02H 3/16
[52] U.S. Cl. ........................................ 361/50; 361/42; 307/118
[58] Field of Search ................ 361/42, 47–50; 307/118; 340/652

[56] References Cited

U.S. PATENT DOCUMENTS

| | | | |
|---|---|---|---|
| 3,813,579 | 5/1974 | Doyle et al. | 361/46 |
| 3,987,341 | 10/1976 | Clark | 361/50 |
| 4,089,031 | 5/1978 | Stevens | 361/50 |
| 4,464,582 | 8/1984 | Aragaki et al. | 307/118 |
| 4,589,047 | 5/1986 | Gaus et al. | 361/42 |

*Primary Examiner*—Todd E. DeBoer
*Attorney, Agent, or Firm*—Paul J. Sutton

[57] ABSTRACT

The present invention teaches a new and novel system for protecting people and property against electrical shock. The invention includes a number of preferred and other embodiments which have this as their goal, but which represent a number of distinctive and novel approaches to solving prior art problems. By way of example only and without limiting the scope of this invention, these approaches include novel immersion detecting circuits, broken wire test circuits, electromechanical circuit breaking means including coil/plunger arrangements, and relay circuit breaking mechanisms cooperative with associated circuitry, all of which are able to be incorporated as a system wholly within the load (appliance) and its associated cord set (including a "plug").

6 Claims, 8 Drawing Sheets

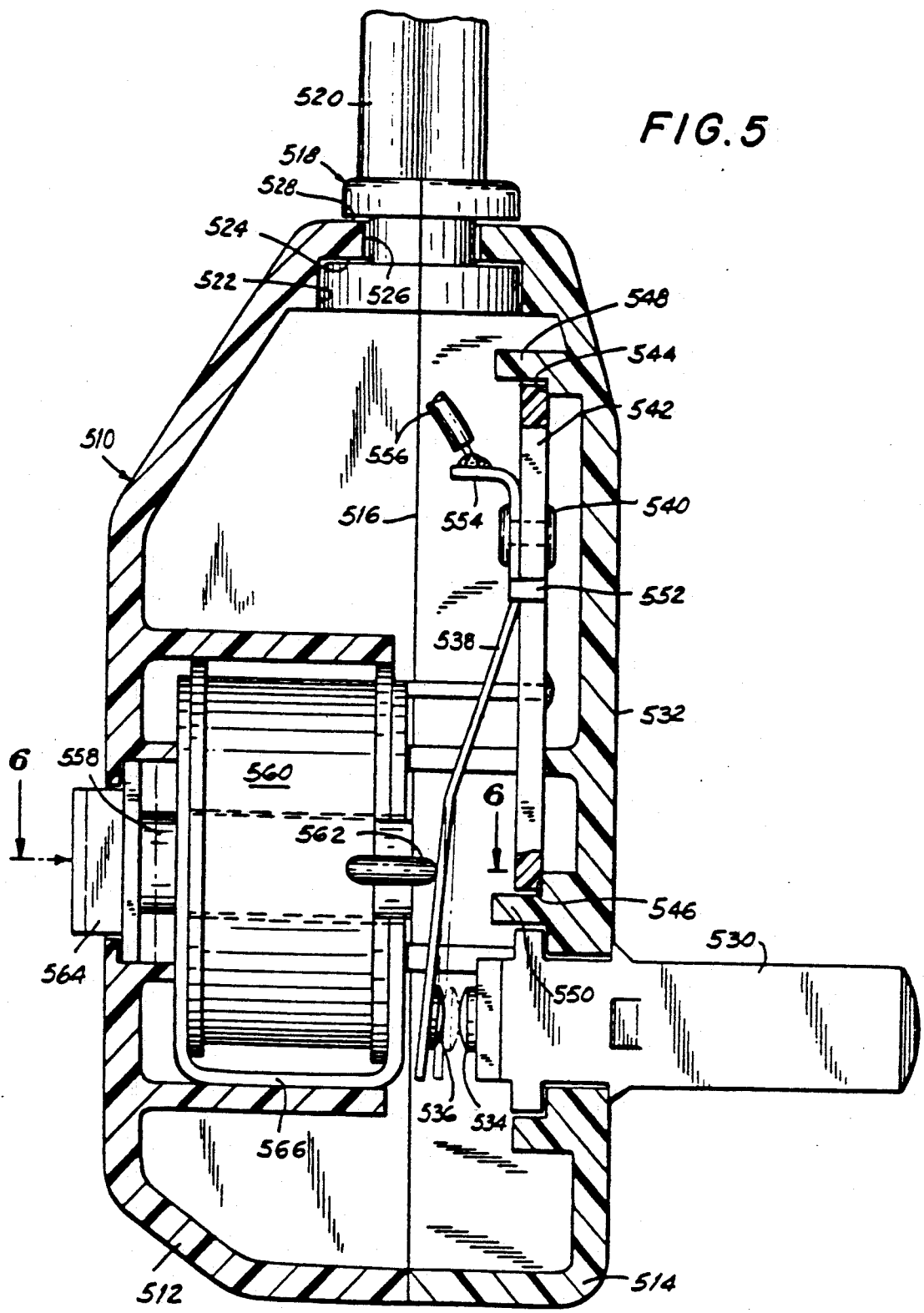

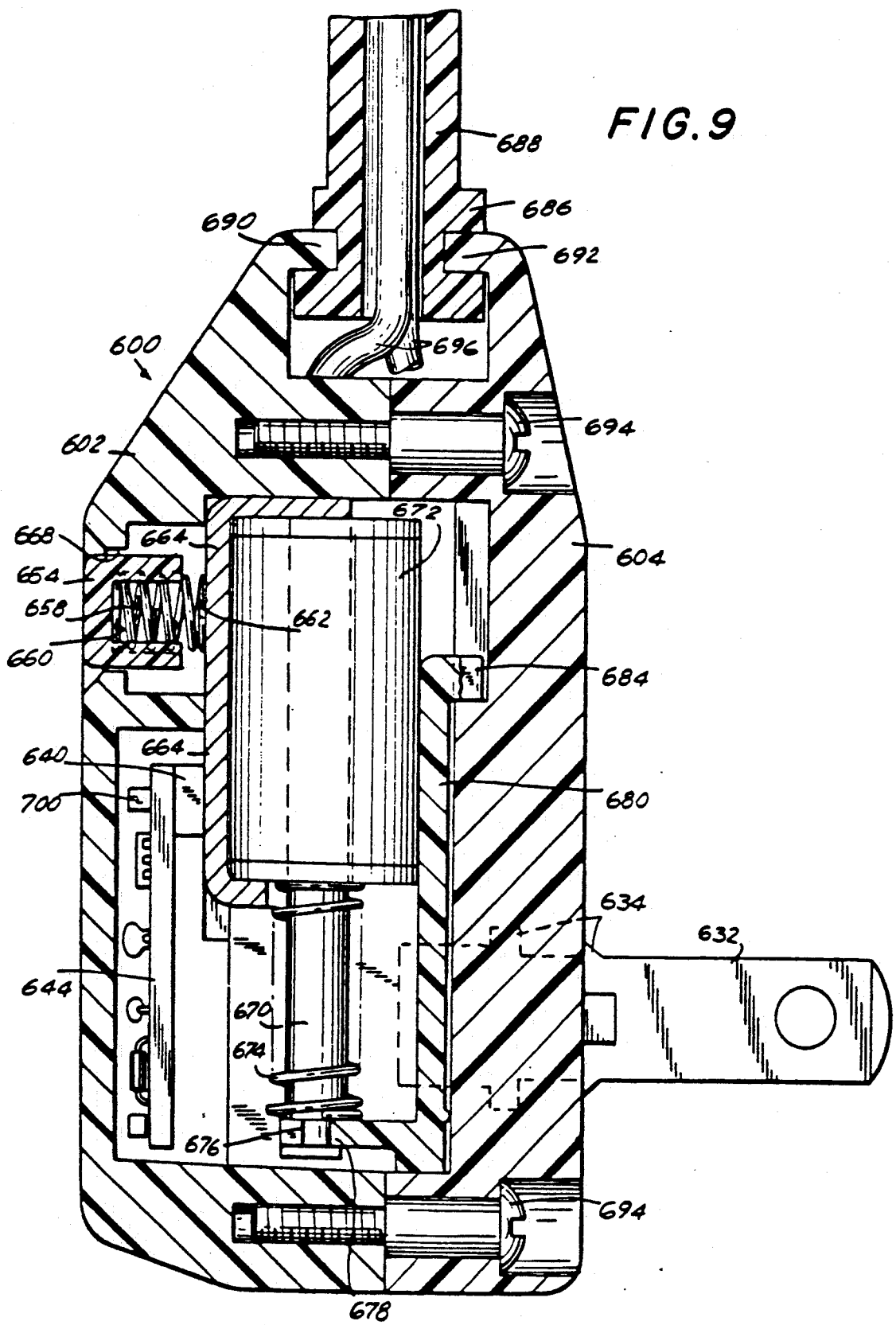

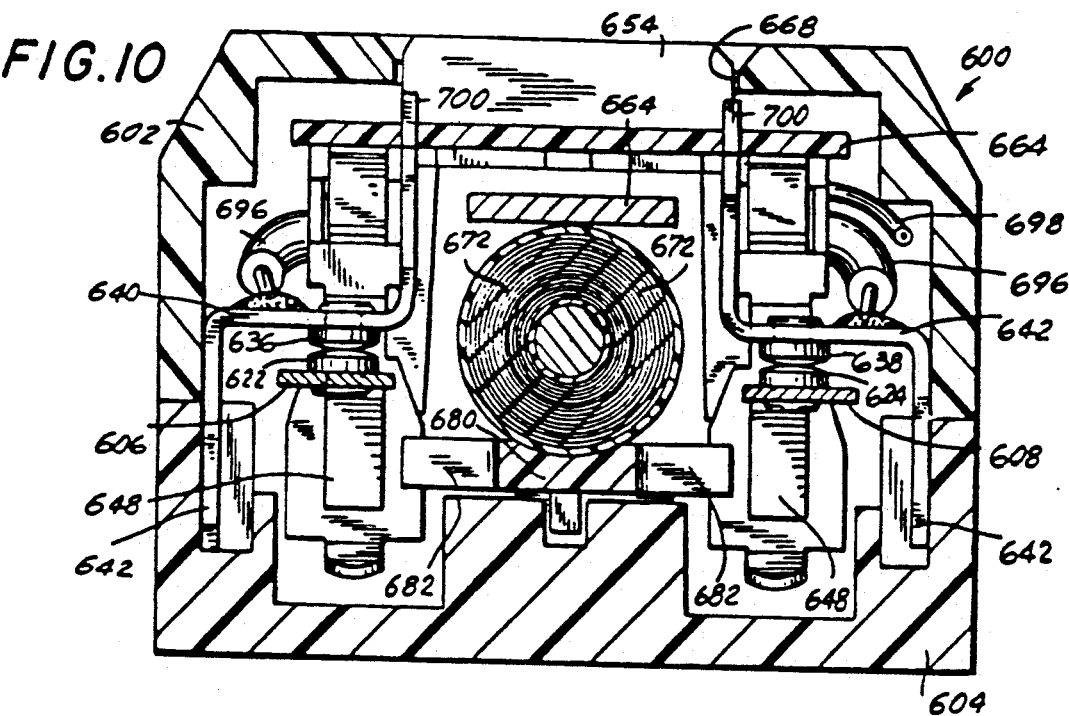
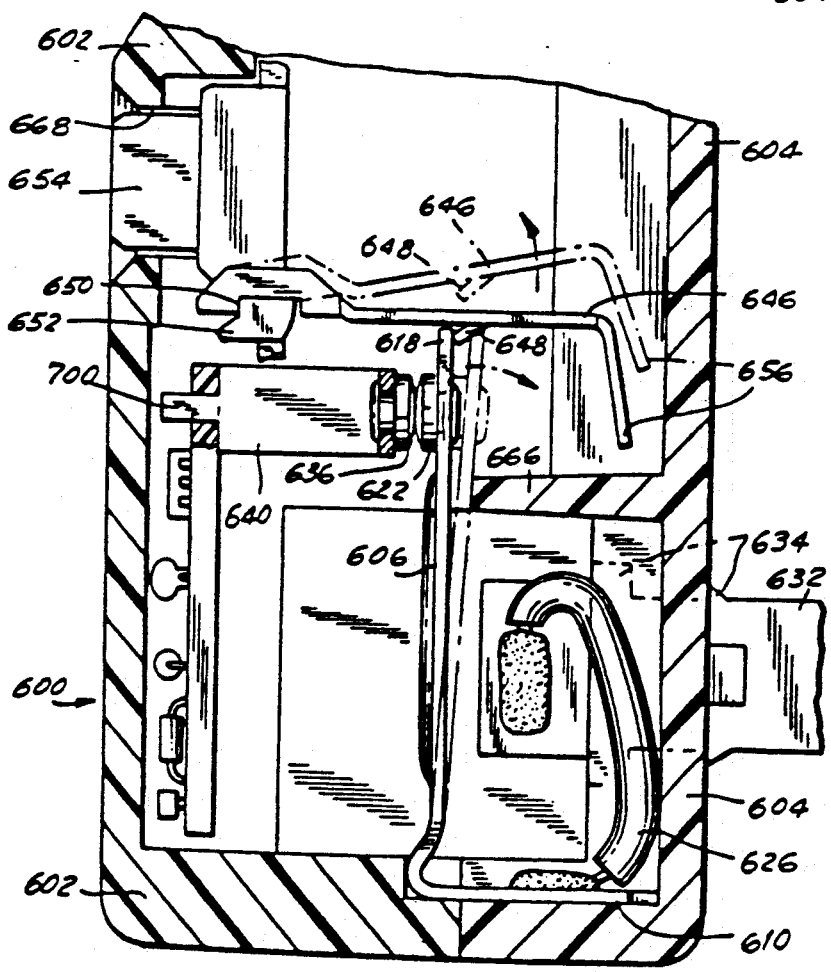

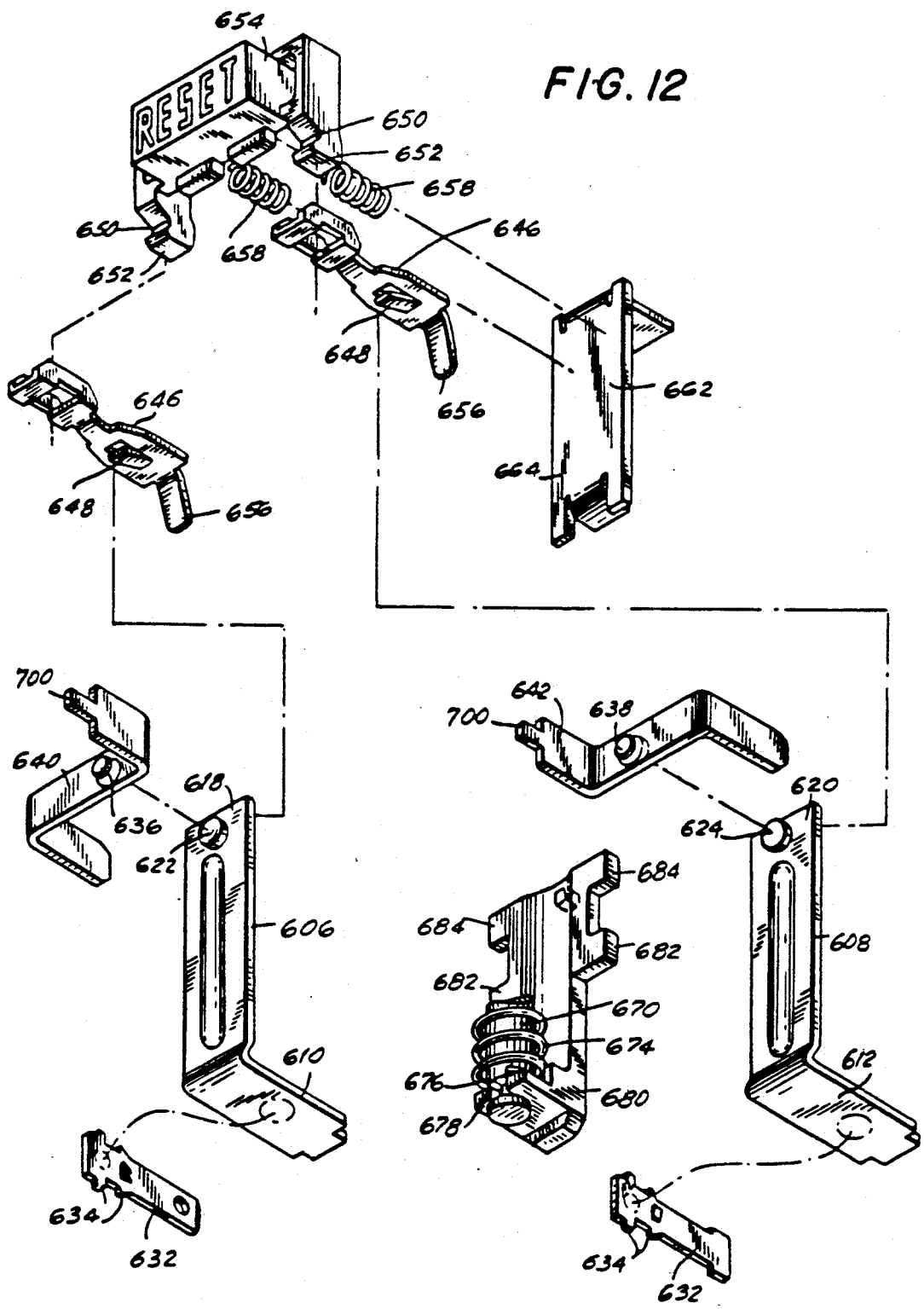

SHOCK HAZARD PROTECTION SYSTEM

This is a continuation of application Ser. No. 618,271, filed Sep. 6, 1990 and now abandoned.

Ser. No. 618271 is a continuation of application Ser. No. 471,258 filed Jan. 26, 1990 and now abandoned.

Ser. No. 471,258 is a continuation of application Ser. No. 352,077, filed May 15, 1989 and now abandoned. Ser. No. 352,077 is a continuation of application Ser. No. 185,571, filed Apr. 25, 1988 and now abandoned. Ser. No. 185,571 is a continuation of application Ser. No. 082,259, filed Aug. 6, 1987 and now abandoned. Ser. No. 082,259 is a continuation of application Ser. No. 001,715, filed Jan. 9, 1987, and issued as U.S. Pat. No. 4,709,293 on Nov. 24, 1987. Ser. No. 001,715 is a continuation of application Ser. No. 880,396, filed Jun. 30, 1986 and now abandoned. Ser. No. 880,396 is a continuation of application Ser. No. 558,260, filed Dec. 5, 1983 and now abandoned.

This invention relates generally to electrical hazard prevention, and more specifically to a shock hazard prevention system for disconnecting an electrical load from an electrical source when a shock hazard condition exists within the load.

Devices for protecting human life and property against electrical shock and damage resulting from a shock hazard condition within an electrical load are known. For example, the model No. 6199 ground fault circuit interruptor (GFCI) marketed by the assignee of the present invention is capable of sensing and responding to the inadvertent grounding of the neutral conductor of an A-C electrical distribution system. It is noted, however, that in certain applications the utilization of such a GFCI is not practical.

In particular, the GFCI is a relatively expensive and complex device which requires the utilization of several transformers. In addition, the GFCI is often hardwired in a wall outlet or receptacle and is neither portable nor readily disconnected. Thus, unless each outlet in which an electrical device such as, for example, an appliance is to be utilized is protected by a GFCI, the user of the appliance is subject to possible injury if a shock hazard condition should exist in conjunction with a non-protected outlet.

In addition, in certain environments the utilization of a conventional GFCI would not afford any shock hazard protection to the user of an appliance. More specifically, a conventional GFCI device of the type known to applicants will not be effective or work if the user of an electrical appliance drops the appliance in a plastic insulated bathtub.

Another potential drawback exists regarding the use of a GFCI for certain types of portable electrical appliances such as, for example, a hair dryer. Although the owner of a hair dryer may have his or her residence outlets adequately protected by GFCI devices, it is possible that other places, such as hotels, the residences of relatives, friends, etc., where it is desired to use the hair dryer may not be protected by such devices.

Accordingly, it is clear that what is needed is a shock hazard protector which is associated with the appliance to be protected itself rather than with the electrical outlet in which the appliance is plugged and energized. It is believed that prior to the present invention, this need has gone unfulfilled.

A need exists for a shock hazard protector which possesses attributes including having a minimum number of components, reliability, cost and portability.

It is accordingly a general object of this invention to overcome the aforementioned limitations and drawbacks associated with the known devices and to fulfill the needs mentioned by providing a hazard protection system having all of the desirable attributes noted above.

It is a particular object of the present invention to provide a shock hazard protector capable of disconnecting an electrical source from an electrical load in response to the detection of a shock hazard condition within the electrical load.

Another object of the present invention is to provide a shock hazard protector capable of detecting and responding to a water-related shock hazard condition within an electrical appliance.

A further object of the present invention is to provide a shock hazard protection system, as above, incorporating immersion detection circuitry.

A still further object of this invention is to provide a shock hazard protection system, as above, wherein a feature is provided for detecting a possible break or discontinuity in a sensing or guard wire.

Yet another object of this invention is to provide a system, as above, wherein a solenoid-type electromechanical mechanism acts as a circuit breaking or interrupting means.

A further object is to provide such a system wherein a relay and associated circuitry and mechanical means enable the desired result.

Yet a further object of this invention is to provide a detection system which detects or senses the presence of a conductive medium, and which causes an event in response thereto.

Another object of this invention is to provide a detection system which detects or senses the absence of the presence of a conductive medium, and which causes an event in response thereto.

Other objects will be apparent from the following detailed description and practice of the invention.

The foregoing and other objects and advantages which will be apparent in the following detailed description of the preferred embodiment, or in the practice of the invention, are achieved by the invention disclosed herein, which generally may be characterized as a hazard protector. The hazard protector includes detecting means associated with a load for detecting a hazard condition within the load, an interrupting means associated with a source to which the load is operatively connected, and conducting means connected between the detecting means and the interrupting means. In response to the detection of a hazard condition within the load by the detecting means, the interrupting means operatively disconnects the source from the load.

Serving to illustrate exemplary embodiments of the invention are the drawings, of which:

FIG. 5 is an enlarged partial sectional elevational view taken through a cord set plug of a relay embodiment of the present invention;

FIG. 9 is a partial sectional elevational view taken along line 9—9 of FIG. 8;

FIG. 10 is a sectional view taken along line 10—10 of FIG. 8;

FIG. 11 is a fragmentary sectional view taken along line 11—11 of FIG. 8; and

FIG. 12 is an exploded-type perspective view of components of the present invention illustrated in FIG. 8.

Figure 1:
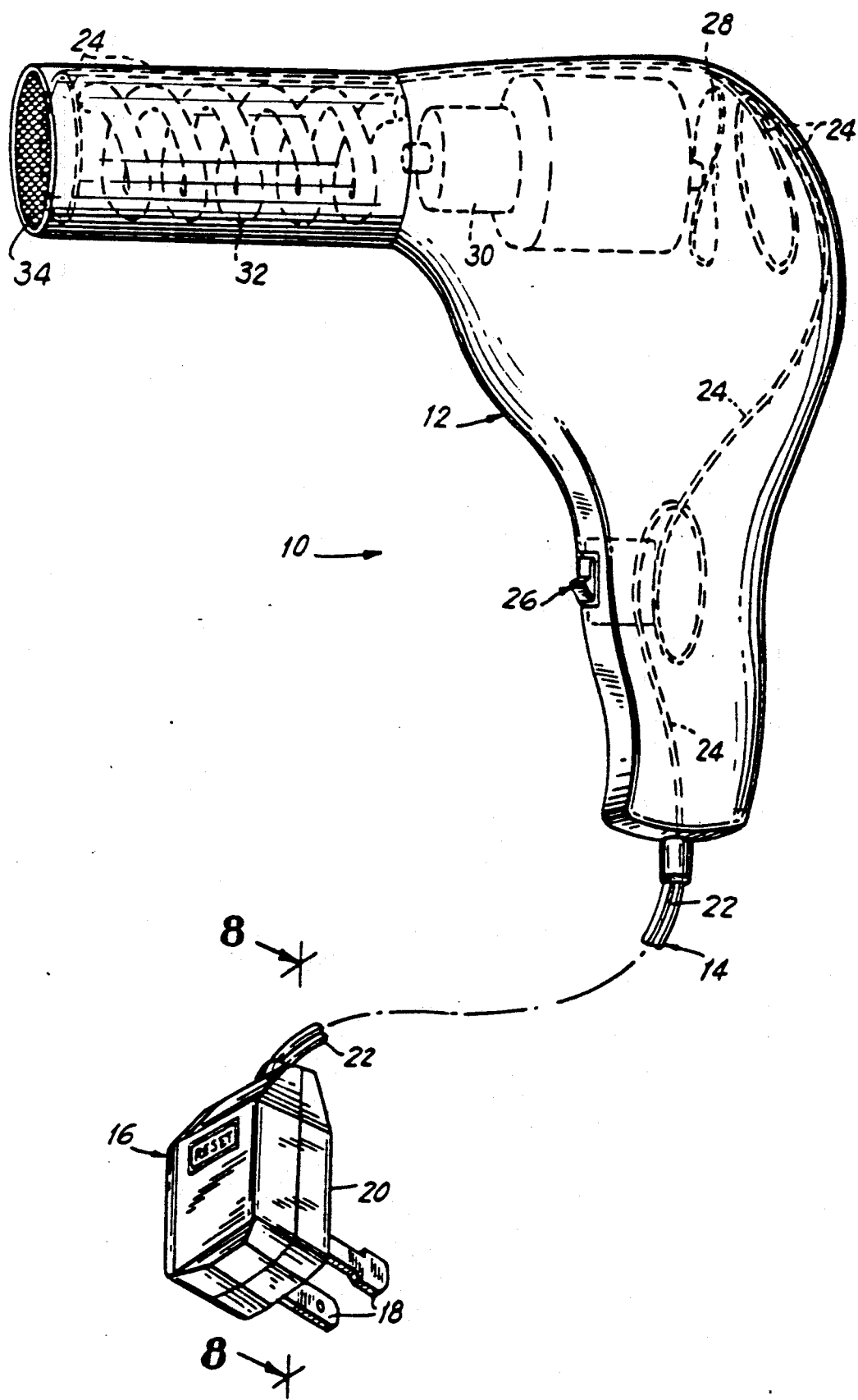
FIG. 1 is a perspective-type view of a hair dryer and its associated cord set incorporating the system according to the present invention.

Referring now in more detail to the drawings, FIG. 1 is presented in its form to illustrate a hair dryer 12 and its associated cord set 14 as wholly containing and constituting or comprising the shock hazard protection system 10 of the present invention. It is applicants' intention and desire to emphasize here the fact that this invention contemplates an electrical appliance, such as of the personal health care type (hair dryers, etc.) which possesses all of the features and advantages of the invention. It is also an intention of applicants to provide the system of the present invention in the form of an OEM product available for sale to manufacturers of such appliances.

A plug assembly 16 is illustrated in FIG. 1 as including polarized blades 18 extending from housing 20. Whereas commercially available hair dryers, as an example of a personal health care appliance, normally include a cord set having two conductors or wires, a third wire 22 is illustrated in the case of cord set 14 electrically communicating with a bare copper wire 24 whose path (in the example given in FIG. 1) includes proximity to and looped circuit near a dryer housing opening through which an on-off switch assembly 26 extends, and thence upward to another loop proximate a dryer housing air inlet opening through which fan 28 driven by motor 30 pulls air to be heated by heating coil 32 before exiting the dryer housing air outlet opening in which grill 34 is positioned. After leaving the second loop described as being adjacent the air inlet opening, wire 22 extends to a third loop adjacent grill 34.

Since heater coil 32 carries and operates on current in the "hot" or phase line, and with the provision of conductor or wire 24 wired as part of the neutral side of the line, the presence of a conductive medium such as, but not limited to, moisture or water between them will create a conductive path contemplated by the invention as enabling interruption of current to the load 12. This embodiment is distinguishable from another embodiment of the present invention wherein a pair of conductors, as opposed to a single guard or sensing conductor 24, are located at or near moisture/water housing penetration points. Configurations of one or more sensing or guard conductors other than those illustrated herein are contemplated as coming within the scope of this invention.

Figure 2:
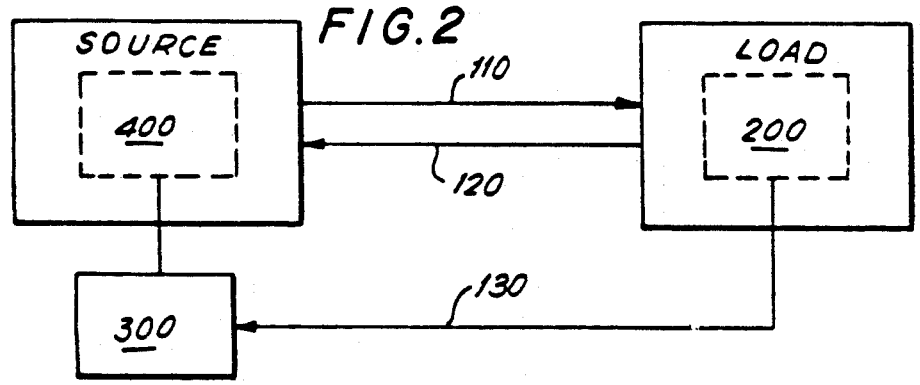
FIG. 2 is a block diagram of the shock hazard protector, in accordance with the present invention.

Referring to FIG. 2, a block diagram of a shock hazard protector according to the present invention is illustrated. As shown therein, it comprises a source operatively connected to a load by first and second conductors 110 and 120, respectively, a detector 200 associated with the load, a control circuit 300 connected to the detector by a sensing or third conductor 130, and an interruptor circuit 400 associated with the source and connected to the control circuit 300. In the case of an electrical A-C source, conductors 110 and 120 are tied to a phase and the neutral terminal, respectively, of the A-C source.

In the normal mode of operation, that is, in the absence of a hazard condition within the load, the control circuit 300, which changes from a first state to a second state in response to the detection of a hazard condition within the load, remains in the first state. Upon the detection by detector 200 of a predefined fault or hazard condition within the load, the control circuit 300 changes from the first to the second state, which causes the interruptor circuit 400 to operatively disconnect the source from the load.

It is noted that the present invention contemplates certain applications where the system sensitivity need not be accurately controlled, and the control circuit 300 can be eliminated. In this situation the interruptor circuit 400 is connected to the detector 200 by the third conductor 130, and responds directly to the detection by detector 200 of a hazard condition within the load.

In either situation, the sensing or third conductor 130 communicates the presence of the hazard condition within the load to the control circuit 300 or the interruptor circuit 400.

Figure 3:
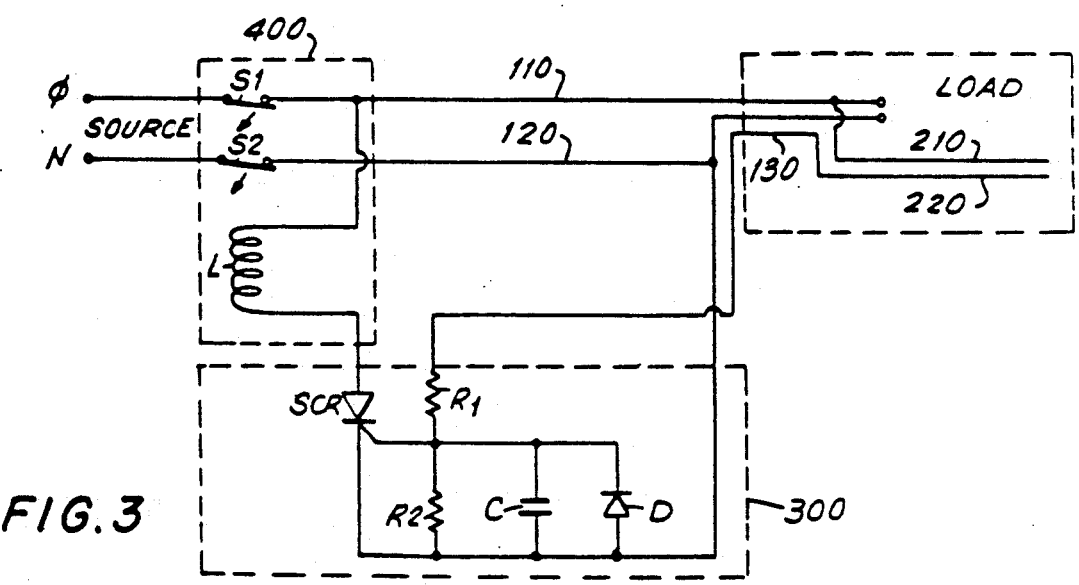
FIG. 3 is a schematic diagram of one embodiment of the shock hazard protector, in accordance with the present invention.

Referring now to FIG. 3, a schematic diagram of one embodiment of the invention particularly suited for use in conjunction with water-related shock hazard conditions within an electrical appliance operatively connected to an A-C source (not shown) by electrical conductors 110, 120, respectively, is illustrated. As shown therein, detector 200 comprises a pair of hazard or immersion detection conductors 210 and 220, which are positioned in a non-contacting relationship and contained within the electrical load. A pair of immersion detection conductors 210 and 220 are preferably located in proximity to each port of the appliance to be protected where water can enter.

For ease of description, it will be assumed that the appliance to be protected only contains one port or opening through which water may enter. For this situation, one end of one of the pair of immersion detection conductors 210 is operatively connected to the phase terminal of an A-C source (not shown) via electrical conductor 110, and one end of the second of the pair of immersion detection conductors 220 is connected to the load end of the third electrical conductor 130. The other ends of immersion detection conductors 210, 220 are unconnected and are maintained in a spaced-apart relationship, typically for example, not more than one inch.

Shock hazard or immersion detection conductors 210, 220 may comprise, for example, a pair of bare electrical conductors or a pair of conducting plates lines on a printed circuit board or other physical configurations that will enable a conductive path between the unconnected ends thereof.

Control circuit 300 comprises a solid state switching control circuit and includes a first resistor R1 connected in-line between the gate of a silicon controlled rectifier SCR and the source end of the third electrical conductor 130. Resistor R1 limits the current applied to the gate of the SCR. In addition, control circuit 300 includes a parallel network comprising resistor R2, capacitor C and diode D connected between the gate and cathode of the SCR. These components provide a measure of noise immunity and protection against damage across the gate to cathode junction of the SCR.

Interruptor circuit 400 comprises an electromechanical interrupting circuit and includes an energizing coil L and a first and second contact or switch S1, S2 connected in-line with the first and second electrical conductors 110, 120, respectively. Switches S1 and S2 are responsive to the flow of current through energizing coil L and are closed when such current is not flowing. In response to the flow of such current they switch from the normally closed position to the shock hazard condition open position. One end of energizing coil L is connected to the first electrical conductor 110 and the other end thereof is connected to the anode of the SCR. The cathode of the SCR is operatively connected to the second electrical conductor 120.

The existence of a water-related shock hazard condition within the electrical appliance is detected when both unconnected ends of the pair of immersion detection conductors 210, 220 are immersed in the water. More specifically, the immersion of both unconnected ends of the pair of immersion detection conductors 210, 220 causes the electrical A-C source to be operatively connected to the gate of the SCR via the path provided by the first electrical conductor 110, the first immersion detection conductor 210, the electrically conducting path provided by the water in which the unconnected ends of the first and second immersion detection conductors 210, 220 are immersed, the second immersion detection conductor 220, the third electrical conductor 130, and resistor R1. In response thereto, the SCR switches from the normally non-conducting state to the shock hazard condition conducting state, thereby providing a path for current to flow through the energizing coil L causing switches S1 and S2 to switch from the normally closed position to the shock hazard condition open position and thus operatively disconnecting the A-C source from the electrical appliance.

To insure that the shock hazard protector is operable prior to utilization of the appliance it protects, a test circuit (not shown) comprising, for example, a resistor in series with a normally open switch connected between the pair of immersion detection conductors 210, 220 may be utilized. Closing the normally open switch causes the resistor to be connected across the immersion detection conductors and, if the shock hazard protector is operating, as described above, causes the A-C source to be operatively disconnected from the appliance. Preferably, the test circuit is contained within the electrical appliance. In conjunction with said test circuit, diode D could be replaced with a light-emitting-diode (LED). If the LED is illuminated with the test switch in the closed position it indicates that the shock hazard protector is not operating properly.

Preferably, electrical conductors 110, 120 and 130 comprise a three wire conductor having an A-C source compatible plug at the source end, the control circuit 300 and interruptor circuit 400 are contained in the plug, and the detector 200 is contained within the appliance.

Thus in the case where the electrical appliance 15, is, for example, a hair dryer, the detector 200 would be located internally within the dryer and, as noted above, in proximity to each port thereof where water can enter the dryer. It should be emphasized here that while water is given as the electrically conductive medium, this invention contemplates a response to any electrically conducting medium, such that the appliance is electrically disconnected from the A-C source in response to the presence of such a conductive medium.

Exemplary values for the circuit illustrated in FIG. 3 are as follows: $R_1$-2000 ohms, $R_2$-1000 ohms, C-0.1 microfarads, D-1N4004, SCR-2N5064.

Figure 4:
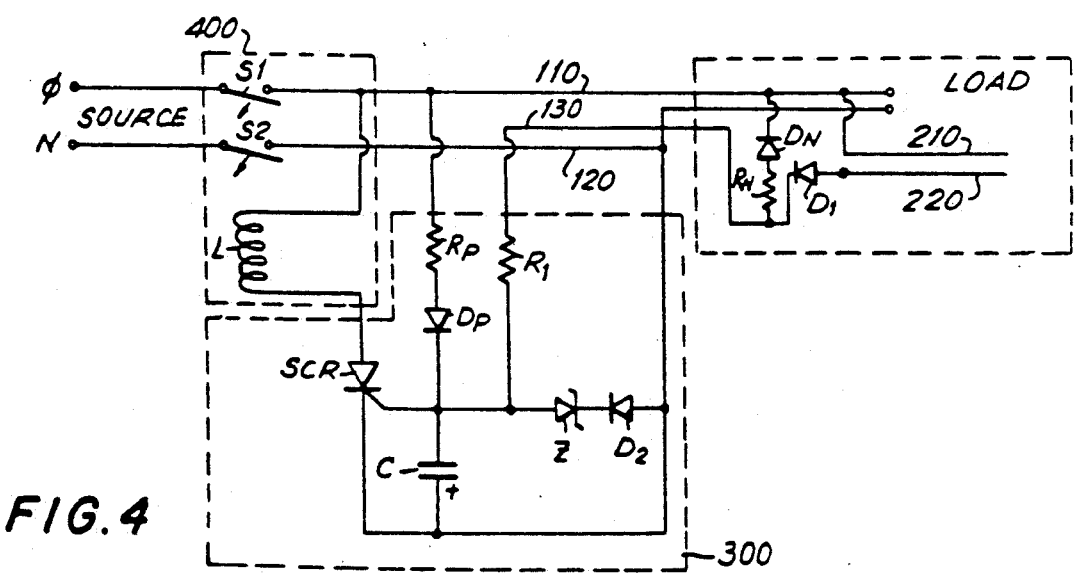
FIG. 4 is a schematic diagram of a second embodiment of the shock hazard protector, in accordance with the present invention.

Referring now to FIG. 4, a schematic diagram of a second embodiment of the present invention particularly suited for use in conjunction with water-related shock hazard conditions within an electrical appliance is illustrated. This embodiment provides an additional feature not present in the first embodiment illustrated in FIG. 3. In particular, the embodiment illustrated in FIG. 3, provides shock hazard protection if any of electrical conductors 110, 120, individually or in combination, are broken, but does not provide shock hazard protection if electrical conductor 130 is broken. The embodiment illustrated in FIG. 4 provides an additional measure of shock hazard protection by rendering the electrical appliance inoperative if any of electrical conductors 110, 120 and 130, individually or in combination, are broken.

This additional measure of protection is provided by the addition of a first diode $D_1$ connected in series between the second immersion detection conductor 220 and the third electrical conductor 130, the replacement of the capacitor connected between the gate and cathode of the SCR with an appropriate charging capacitor, the addition of a first charging circuit comprising resistor $R_N$ and diode $D_N$ connected between the first and third electrical conductors 110, 130, the addition of a zener diode in series with the diode connected between the gate and cathode of the SCR, the addition of a second charging circuit comprising resistor Rp and diode Dp connected between the first electrical conductor 110 and the gate of the SCR, and the elimination of resistor $R_2$ connected between the gate and cathode of the SCR.

The operation of the circuit illustrated in FIG. 4 is as follows. Assuming that the sensing or third conductor 130, is intact, the appliance is not immersed in water and that it is energized, during the negative half cycle of the A-C signal on electrical conductor 110 a negative charging path via diode $D_N$, resistor $R_N$, third conductor 130, resistor $R_1$ provides charge to capacitor C, thereby charging it negatively. During the positive half cycle diode $D_N$ blocks, however, a positive charging path via resistor Rp and diode Dp provides charge to capacitor C, thereby charging it positively. Since the time constant of resistor $R_p$ and capacitor C, is roughly 33 times greater than the time constant of resistor $R_N$ and capacitor C, the capacitor C charges much faster in the negative sense, so that under steady state conditions a negative voltage exists on the gate of the SCR thereby keeping it in a non-conducting state. In order to limit that negative voltage to a value that would not damage the gate to cathode junction of the SCR a three volt zener diode is added in series with diode $D_2$, also in parallel with capacitor C.

The next condition to look at is a broken third conductor 130. Under this condition a negative charging path no longer exists for the negative voltage to be impressed on capacitor C, and, therefore during positive half cycles capacitor C will discharge positively and eventually the voltage on the gate of the SCR will get high enough to trip the SCR, causing it to switch to the conducting state thereby operatively disconnecting the A-C source from the appliance, putting you in a safe condition. Exemplary values for the circuit illustrated in FIG. 4 are as follows: $D_1$, $D_2$, $D_N$, $D_p$-1N 4004, $R_N$-30,000 ohms, $R_p$-1,000,000 ohms, $R_1$-2000 ohms, C-1 microfarad, SCR-2N5064, Z-3 volt zener diode.

Preferably, the components comprising the first charging circuit $R_N$, $D_N$ and diode $D_1$ are contained within the electrical appliance and are waterproof, and the components comprising the second charging circuit Rp, Dp and the zener diode D are contained in the plug.

It is noted that with minor modifications the above described invention has many other applications. For example, in the situation where the electrical appliance comprises a power tool, such as a drill having an electrically conducting housing, the teachings of the present invention may be utilized by eliminating immersion detection conductor 220 and connecting the third electrical conductor 130 to the electrically conducting housing. The immersion in water of the unconnected end of shock hazard detection conductor 210 provides an electrically conductive path between the shock hazard detection conductor and the electrically conducting housing of the drill causing, as described above, the drill to be operatively disconnected from the A-C source.

Referring now to an embodiment of the present invention which utilizes the approach of a relay mechanism to accomplish the circuit interrupting goal of the invention, FIG. 5 illustrates a shock hazard protector embodiment of a plug assembly 510 formed with a housing with base and cover body halves 512 and 514, respectively, joined at a housing reference line 516. A strain relief 518 comprises part of cord 520 and, in cooperative combination with the shape and contour of annular surfaces 522, 524, 526 and 528, serves as a means for protecting the integrity of electrical connections during use.

Blades 530 extend outwardly from surface 532 of housing half 512 and serve the function of matingly and electrically engaging electrical contacts within a receptacle (not shown) or electrical outlet in the home, for example. A fixed contact 534 is associated and integral with each of the blades 530, contacts 534 being fixed or stationary as opposed to movable when assembled.

A pair of movable contacts 536 are provided and are integral with leaf springs 538 which, in turn, are anchored by means of eyelets 540 extending through openings in an end portion of the leaf springs 538 spaced from the movable contacts 536. These eyelets further extend through openings through a printed circuit board 542 supported by ledges 544 and 546 adjacent upstanding walls 548 and 550, as shown in FIG. 5.

A tab 552 associated with each leaf spring 538 further anchors the leaf springs to the printed circuit board in spaced relationship with the aforesaid eyelets, thereby serving an additional function of preventing undesirable rotation of the leaf springs 538, assuring alignment and reliably repeated engagement between the fixed and movable contacts 534 and 536, respectively. Leaf springs 538 are configured to normally bias the movable contacts 536 away from the fixed contacts 534 when in an unstressed condition, thereby normally interrupting an electrical path between these contacts.

The ends of leaf springs 538 are formed with upstanding flanges 554 to which conductors 556 are connected.

Figure 6:
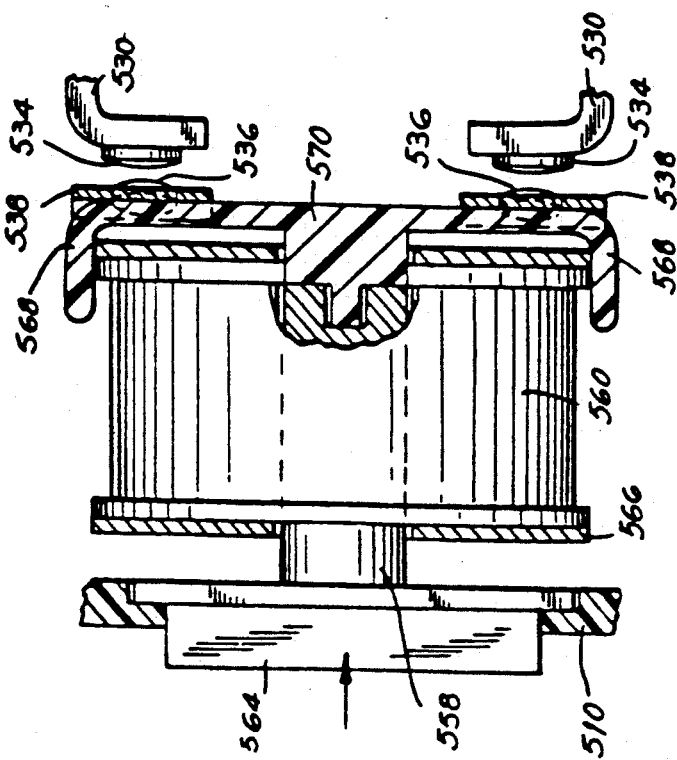
FIG. 6 is a partial fragmentary sectional plan view taken along the line 6—6 of FIG. 5.

A plunger or core 558 is disposed vertically within a bobbin coil 560, as illustrated in FIG. 5. A reset button 564 contacts the uppermost portions of plunger 558, while a butterfly cross bar 562 extends laterally across the plug housing and in contact with upper surfaces of leaf springs 538. The upward biasing forces of leaf springs 538 maintain the cross bar 562, plunger 558 and reset button 564 in the positions shown in FIG. 5, while a metal strap 566 extends about portions of coil 560 as shown. The cross sectional shape of reset button 564 is polygonal, such as square, to prevent rotation thereof, while the cross sectional shape of core or plunger 558 is round to provide maximum electromagnetic efficiency in its interaction with bobbin coil 560. FIG. 6 illustrates in a cross sectional view what applicants refer to as the "butterfly" with arms 568 being splayed outwardly from a center rivet member 570 aligned with plunger 558.

In operation, power for the printed circuit board electronic components is supplied by a copper path on the board via pins 572 extending downwardly from the bobbin coil 560. Prior to a shock hazard predetermined condition, the system of FIG. 5 is "set" by means of depressing set or reset button 564 inwardly, which results in movement of the plunger and the cross bar against the opposing biasing forces of leaf springs 538. This depression of the set or reset button will result in movement of the leaf springs until the movable contacts engage the fixed contacts, thereby completing an electrical circuit.

The completion of the electrical circuit just described results in current flow to the bobbin coil which, in turn, electromagnetically "keeps" and holds the plunger in its depressed position until an interruption of such current flow. The interengagement of the movable and fixed contacts further serves to enable the supply of power to the load or appliance with which the inventive assembly of FIG. 5 is associated, again, until an interruption in current flow to the bobbin coil.

In the event of the presence of a shock hazard condition, as a result of the operation of circuitry of FIG. 7 described in detail below, current to the bobbin coil is interrupted, with the result that the upward biasing forces of leaf springs 538 rapidly cause a separation of the movable contacts away from the fixed contacts, thereby in turn causing an interruption of power from the source through the blades to the load or appliance.

Figure 7:
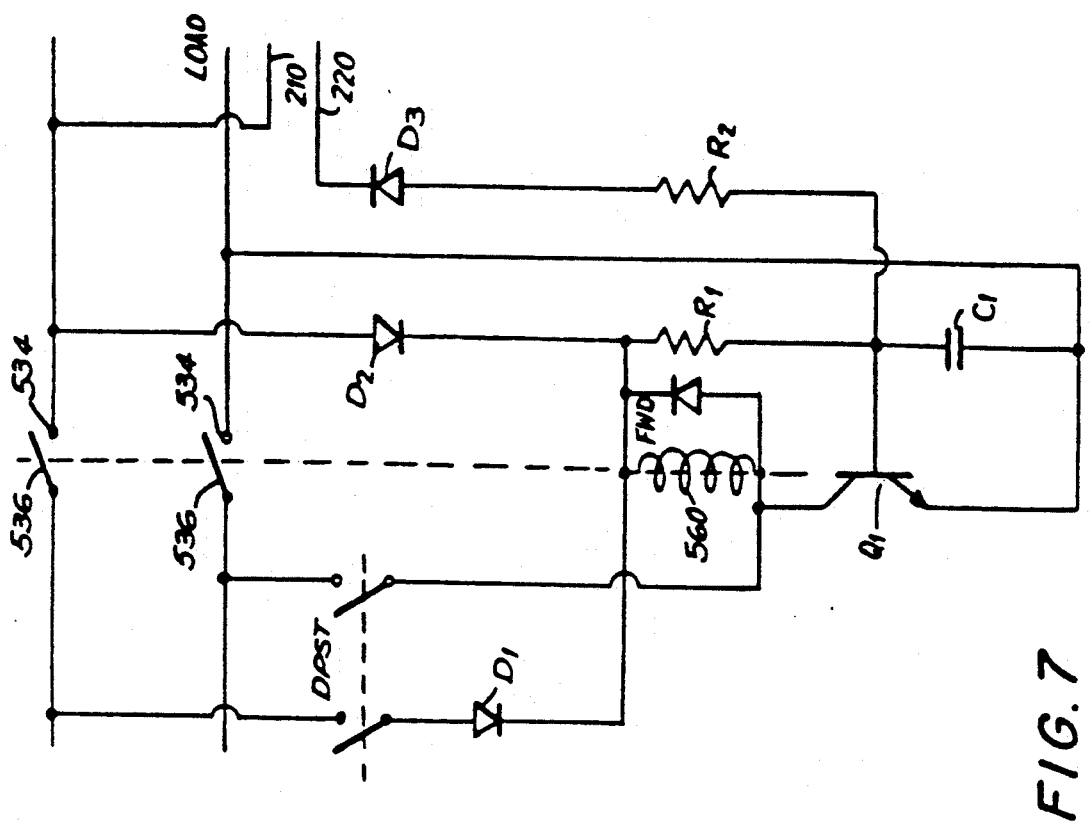
FIG. 7 is a schematic circuit diagram of the embodiment of the present invention associated with FIGS. 5 and 6.

Referring now to FIG. 7 of the drawings, the aforesaid circuitry associated with the device of FIG. 5 is illustrated with like components in FIGS. 5 and 7 carrying like reference characters. With the relay of FIG. 5 being fed with half wave rectified alternating current, or pulsating direct current, there is some current flow during the negative half cycle or the half cycle other than that when line current is flowing. A free wheeling diode FWD continues current flow.

The main contacts $M_C$ are normally open. When it is desired to turn on the appliance after plugging it into a receptacle power source set or reset button 564 is depressed, bringing movable contacts 536 into engagement with fixed contacts 534. This applies half wave rectified direct current to the bobbin coil. This results in applying a voltage from the phase line through the double pole single throw switch DPST, through a diode $D_1$, thence through the bobbin coil, with the other end of the coil going through another contact of the double pole switch to neutral. Thus, by pushing the switch or reset button, the coil is energized, and the main contact $M_C$ is closed.

Once the main contact $M_C$ is closed, a parallel path for the current is provided through another diode $D_2$, such that there is current flow from phase through diode $D_2$ through the coil with its free wheeling diode in parallel with it, thence through the collector of a transistor $Q_1$, the emitter of the transistor $Q_1$ being connected to neutral. The transistor is kept on by a resistor going from phase to the base. $R_1$ is the resistor between phase and the base.

Once the coil energizes itself as described, the transistor is turned on and then the momentary contact in the DPST is released and the coil is self-holding. Should the load or appliance be dropped into water, creating a shock hazard condition, the current in a sense line is rectified by diode $D_3$ and a resistor $R_2$ puts a negative voltage onto the base of the transistor. A capacitor $C_1$ is provided between the transistor base and the emitter which will essentially store whatever voltage was present to smooth it out. By setting the value of $R_2$ relatively small with respect to the value of $R_1$, the time constant of the negative current is shorter than that of the positive current and in this way there is a negative charge turning off the transistor with the result that the movable contacts separate from the fixed contacts (FIG. 5).

The reader is cautioned not to construe the examples presented in this specification, such as in describing hair dryers or other appliances, as limiting the invention to these examples. Any electrical appliance or apparatus with which a shock hazard may be associated is contemplated as being favorably affected by the advantages and features of the present invention.

Figure 8:
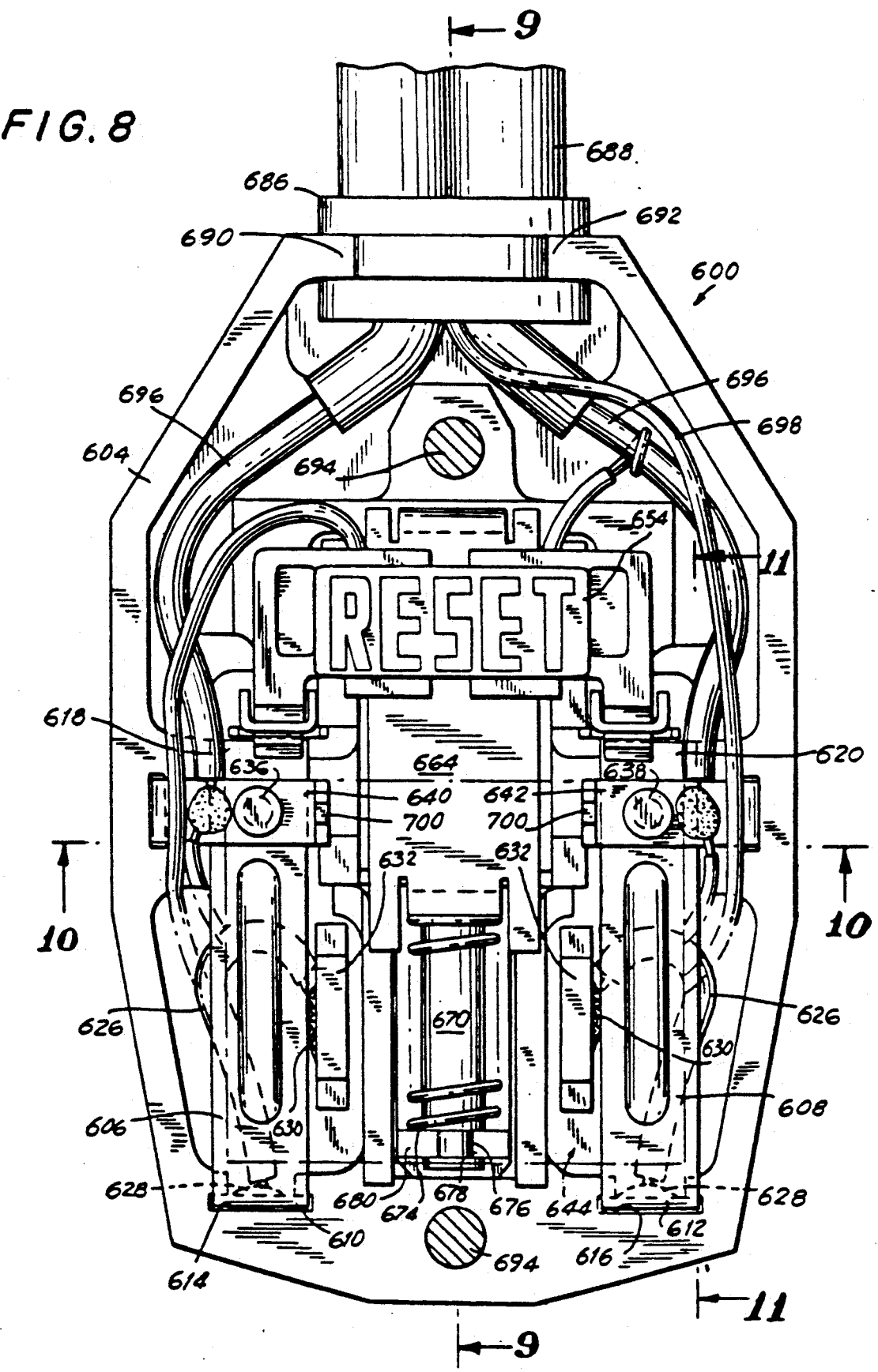
FIG. 8 is an elevational view of the cord set plug illustrated in FIG. 1 and taken along line 8—8 of that same FIG. 1 depicting the assembled plug with its cover removed.

Referring now to another embodiment of the present invention illustrated in FIGS. 8-12, a novel electromechanical and electromagnetic combination serves a circuit interrupting or breaking function, as well as other functions. In FIG. 8 a plug assembly 600 of the type designated with reference character 16 in FIG. 1 is shown with cover housing half 602 removed to illustrate base housing half 604 with its assembled subassemblies in place. A pair of movable contact arms 606 and 608 are each anchored at their respective angled depending legs 610 and 612 within slots or recesses 614 and 616 of base housing half 604. Near ends 618 and 620 of movable arms 606 and 608, respectively, remote from their ends 610 and 612, silver contacts 622 and 624 are respectively riveted to arms 606 and 608.

Flexible conductors 626 are welded at 628 to depending legs 610 and 612 at one of their ends, and at their other ends 630 the flexible conductors are welded to plug insertion blades 632. Blades 632 are configured with mounting shoulders 634 so as to be held relatively integral with base 604 when assembled.

Movable contact arms 606 and 608 are normally biased in the direction shown in phantom lines within FIG. 11 such that they bias the silver contacts 622 and 624 away from fixed silver contacts 636 and 638 which are riveted to fixed contact terminals 640 and 642, respectively. The fixed contact terminals 640 and 642 themselves are physically and electrically connected to a printed circuit board 644 which carries one of the electrical circuit embodiments described above and contemplated by the invention.

A latch member 646 formed with a tang 648 is associated with each movable contact arm and each is mounted and pivoted at its upper end on pivot points 650 formed on legs 652 of a set/reset button 654. At their lower ends 656, latches 646 are formed with a downward bend or leg, as viewed in FIG. 11, these latter legs giving the latches structural stability for added reliability. The full lines of FIG. 11 illustrate latches 646 in their latched or set position, with tangs 648 holding the ends of movable contact arms 606 and 608 such that movable silver contacts 622 and 624 are in physical and electrical engagement with fixed silver contacts 636 and 638, thereby enabling current flow through blades 632 from a source such as an electrical receptacle to a load, such as hair dryer 12.

Reset button 654 is normally biased in a direction away from blades 632 by means of helical compression springs 658 shown in FIGS. 9 and 12, for example. Springs 658 are held captive between and exert forces against opposing surfaces 660 and 662 of the underside of the reset button 654 and a metallic frame 664 (see FIG. 9). Set/reset button 654 is visible to the user through a window 668 formed within cover housing half 602 and preferably carries indicia of the type illustrated in FIG. 8 to draw attention to its function.

When the movable contact arms 606 and 608 are in the positions shown in FIG. 11 in phantom outline, resting against a wall 666 formed in base housing half 604, such that the electrical circuit is in an interrupted state with the movable and fixed contacts spaced in opposition with respect to one another, the user of the present invention is able to close the circuit, assuming no hazard condition is present, by depressing with his or her finger the set/reset button 654. This depression of the button 654 causes latches 646 to move in the same direction as the movable button 654 and in sliding engagement with the ends of the movable contact arms 606 and 608 until and such that tangs 648 ride over these arm ends. Release of the formerly depressed button 654 results in its only partially returning under the influence of springs 658 towards its original position, with a resulting pulling of the movable contacts 622 and 624 into engagement with their respective opposing contacts 636 and 638 by latch tangs 648 against the undersides of the movable arm ends, thereby setting the system and closing the circuit. Latches 646 and their tangs 648 hold the movable contacts in the last position just described until a hazard condition is sensed or detected. In such an event, a plunger 670 shown in FIGS. 8 and 9 as being normally biased away from its associated winding or coil 672 by means of a helical compression spring 674 is caused to rapidly approach the core of coil 672 as a result of its being energized. Plunger 670 is formed with a neck 676 adjacent its end remote from coil 672, with which a clevis 678 of what will here by referred to as a banger 680 matingly engages. Banger 680 is further formed with pairs of trip and reset dogs 682 and 684 movable paths that coincide with latch 646. Upon energization of coil 672, trip dogs 682 rapidly come into contact with and "bang" against the surfaces of latches 646 facing wall 666, forcibly disengaging the latches 646 and their tangs 648 from the movable contact arms, with the result that these arms return to their rest positions against wall 666, and interrupt current flow through the movable and fixed contacts. Once the current is interrupted, the compression forces within spring 674 cause the plunger 670 and its interconnected banger 680 to return to the position illustrated in FIG. 9, with the reset dogs 684 coming into contact with and biasing the latches 646 against the ends of the movable contact arms 606 and 608.

Frame 664 comprises part of the magnetic circuit associated with an operating winding or coil 672, and for that purpose encloses a portion of the coil. A strain relief 686 formed in the insulation of a cord set 688 is shown in FIGS. 8 and 9 held between opposing annular walls 690 and 692, respectively, of housing halves 602 and 604 which, in turn, are releasably secured together by means of fasteners 694. Cord set 688 corresponds to the cord set 14 illustrated in FIG. 1.

FIG. 8 illustrates the printed circuit board 644 in broken-line outline in the position it occupies atop the banger assembly and the fixed contacts. FIG. 8 further illustrates the three wires, phase/neutral 696 and the guard or sensing wire 698 which extend through and as part of cord set 688, through the strain relief 686, and into the confines of plug assembly 600. Sensing wire 698 corresponds to the third wire 22 of FIG. 1 which electrically communicates with a sensing wire in the load, such as sensing wire 24 of FIG. 1, and wire 698 is coupled to the PC board 644 while the phase and neutral lines are electrically secured to the fixed contact terminals 640 and 642. Terminals 640 and 642 are soft soldered to the PC board 644 by means of mounting tabs 700.

The present invention thus provides the user with a shock hazard protection system which: has a reponse time that conforms to Underwriters Laboratories requirements; is trip free; possesses a double pole interrupting mechanism with an air gap switch; operates with reverse polarity; requires only a 2 pole receptacle; operates in an ungrounded environment, such as a plastic tub; is of a reasonable size and cost; provides the user with a visible trip indication; meets Underwriters Laboratories overload, short circuit, and endurance requirements; possesses electrical noise immunity so as to minimize false tripping; provides protection in the event the cord is broken, with proper polarity assumed; provides adequate strain relief; is usable with a combination switch/receptacle; and provides protection whether the load or appliance switches are on or off, or are at medium or high settings.

The embodiments of the present invention herein described and disclosed are presented merely as examples of the invention. Other embodiments, forms and structures coming within the scope of this invention will readily suggest themselves to those skilled in the art, and shall be deemed to come within the scope of the appended claims.

What is claimed is:

1. In combination with an electrical load operatively connected to an A-C source by a cord set including a first and second electrical conductor each having a source end and a load end, respectively, and a plug compatible with said A-C source, a shock hazard preventing circuit comprising:
    a third electrical conductor having a source end and a load end;
    a first and second shock hazard detection conductor each having a connected end and an unconnected end, respectively, positioned in a non-contacting relationship and contained within said load, the connected end of said first shock hazard detection conductor being connected to the load end of said first electrical conductor, the connected end of said second shock hazard detection conductor being connected to the load end of said third electrical conductor, and the unconnected ends of said first and second shock hazard detection conductors being maintained in a spaced-apart relationship;
    an interrupting circuit contained within said plug and including an energizing coil and a first and second switch responsive to the flow of current through said energizing coil, said first switch being operable between a normally closed position and a shock hazard condition open position and connected in-line with said first electrical conductor, said second switch being operable between a normally closed position and a shock hazard condition open position and connected in-line with said second electrical conductor;
    a switching control circuit contained within said plug and including a silicon controlled rectifier operable between a normally non-conducting state and a shock hazard condition conducting state, a first resistor connected in series between the gate of said silicon controlled rectifier and the source end of said third electrical conductor, and network means comprising a plurality of electrical elements connected in parallel with each other, said network means being connected between the gate and the cathode of said silicon controlled rectifier for providing noise immunity and damage protection to said silicon controlled rectifier;
    such that the immersion in an electrically conductive medium of the unconnected ends of said first and second shock hazard detection conductors provides an electrically conductive path between said first and second shock hazard detection conductors causing said A-C source to be operatively connected to the gate of said silicon controlled rectifier resulting in the switching of said silicon controlled rectifier from the normally non-conducting state to the shock hazard condition conducting state thereby providing a path for current flow through said energizing coil and causing said first and second switches to switch from the normally closed position to the shock hazard condition open position and thus operatively disconnecting said A-C source from said electrical load, and wherein said network means comprises a network comprising a second resistor, a capacitor in parallel with said second resistor, and a diode connected in parallel with said capacitor.

2. The combination recited in claim 1 wherein the cathode of said diode is connected to said gate of said silicon controlled rectifier.

3. In combination with an electrical load contained within an electrically conducting housing and operatively connected to an A-C source by a cord set including a first and second electrical conductor each having a source end and a load end, respectively, and a plug compatible with said A-C source, a shock hazard preventing circuit comprising:
    a third electrical conductor having a source end and a load end;
    a shock hazard detection conductor contained within said electrical load and maintained in a non-contacting relationship with said electrically conducting housing, one end of said shock hazard detection conductor being connected to the load end of said first electrical conductor and the other end of said shock hazard detection conductor being unconnected and maintained in a spaced-apart relationship with said electrically conducting housing, and said electrically conducting housing being connected to the load end of said third electrical conductor;

an interrupting circuit contained within said plug and including an energizing coil and a first and second switch responsive to the flow of current through said energizing coil, said first switch being operable between a normally closed position and a shock hazard condition open position and connected in-line with said first electrical conductor, and said second switch being operable between a normally closed position and a shock hazard condition open position and connected in-line with said second electrical conductor;

a switching control circuit contained within said plug and including a silicon controlled rectifier operable between a normally non-conducting state and a shock hazard condition conducting state, a first resistor connected in series between the gate of said silicon controlled rectifier and the source end of said third electrical conductor, and network means comprising a plurality of electrical elements connected in parallel with each other, said network means being connected between the gate and the cathode of said silicon controlled rectifier for providing noise immunity and damage protection to said silicon controlled rectifier; such that the immersion in an electrically conductive medium of the unconnected ends of said first and second shock hazard detection conductors provides an electrically conductive path between said first and second shock hazard detection conductors causing said A-C source to be operatively connected to the gate of said silicon controlled rectifier resulting in the switching of said silicon controlled rectifier from the normally non-conducting state to the shock hazard condition conducting state thereby providing a path for current flow through said energizing coil and causing said first and second switches to switch from the normally closed position to the shock hazard condition open position and thus operatively disconnecting said A-C source from said electrical load and wherein said network means comprises a network comprising a second resistor, a capacitor connected in parallel with said second resistor, and a diode connected in parallel with said capacitor.

4. The combination recited in claim 3 wherein the cathode of said diode is connected to said gate of said silicon controlled rectifier.

5. In combination with an electrical appliance operatively connected to an A-C source by a cord set including a first and second electrical conductor each having a source end and an appliance end, respectively, and a plug compatible with said A-C source, a shock hazard preventing circuit comprising:

a third electrical conductor having a source end and an appliance end and contained within said cord set;

a first and second shock hazard detection conductor each having a connected end and an unconnected end, respectively, positioned in a non-contacting relationship and contained within said electrical appliance, the connected end of said first shock hazard detection conductor being connected to the appliance end of said first electrical conductor, the connected end of said second shock hazard detection conductor being connected to the appliance end of said third electrical conductor, and the unconnected ends of said first and second shock hazard detection conductors being maintained in a spaced-apart relationship;

an interrupting circuit contained within said plug and including an energizing coil and a first and second switch responsive to the flow of current through said energizing coil, said first switch being operable between a normally closed position and a shock hazard condition open position and connected in-line with said first electrical conductor, and said second switch being operable between a normally closed position and a shock hazard condition open position and connected in-line with said second electrical conductor;

a switching control circuit contained within said plug and including a silicon controlled rectifier operable between a normally non-conducting state and a shock hazard condition conducting state, a first resistor connected in series between the gate of said silicon controlled rectifier and the source end of said third electrical conductor, and network means comprising a plurality of electrical elements connected in parallel with each other, said network means being connected between the gate and the cathode of said silicon controlled rectifier for providing noise immunity and damage protection to said silicon controlled rectifier;

such that the immersion in an electrically conductive medium of the unconnected ends of said first and second shock hazard detection conductors provides an electrically conductive path between said first and second shock hazard detection conductors causing said A-C source to be operatively connected to the gate of said silicon controlled rectifier from the normally non-conducting state to the shock hazard condition conducting state thereby providing a path for current flow through said energizing coil and causing said first and second switches to switch from the normally closed position to the shock hazard condition open position and thus operatively disconnecting said A-C source from said electrical load and wherein said network means comprises a network comprising a second resistor, a capacitor connected in parallel with said second resistor, and a diode connected in parallel with said capacitor.

6. The combination recited in claim 5 further the cathode of said diode is connected to said gate of said silicon controlled rectifier.

* * * * *